United States Patent [19]

Quack

[11] Patent Number: 4,710,413
[45] Date of Patent: Dec. 1, 1987

[54] COATING COMPOSITION AND ITS USE FOR THE PREPARATION OF OXYGEN BARRIER COATINGS ON PLASTIC ARTICLES

[75] Inventor: Wolfgang Quack, Mettman, Fed. Rep. of Germany

[73] Assignee: Dow Chemical Handels-und Vertriebsgesellschaft mbH, Midland, Mich.

[21] Appl. No.: 760,235

[22] Filed: Jul. 29, 1985

Related U.S. Application Data

[62] Division of Ser. No. 653,397, Sep. 24, 1984, abandoned.

[51] Int. Cl.⁴ .......................... C08F 8/00; C08L 27/00
[52] U.S. Cl. ...................................... 428/36; 525/129; 525/933

[58] Field of Search .................... 525/129, 933; 428/36

[56] References Cited

U.S. PATENT DOCUMENTS 3,879,330  4/1975  Lustig ................................ 525/129
4,593,853  6/1986  Schad .................................. 237/56

Primary Examiner—Lewis T. Jacobs
Assistant Examiner—A. Carrillo

[57] ABSTRACT

This invention relates to a coating composition of a thermoplastic vinylidene chloride copolymer and a thermoplastic polyester urethane and the use of said coating composition for the preparation of oxygen impermeable flexible coatings on plastic articles, in particular synthetic pipes for floor heatings.

9 Claims, No Drawings

COATING COMPOSITION AND ITS USE FOR THE PREPARATION OF OXYGEN BARRIER COATINGS ON PLASTIC ARTICLES

This is a divisional of application Ser. No. 653,397 filed Sept. 24, 1984, now abandoned.

Articles of synthetic material often have a considerable oxygen permeability. This property is particularly disadvantageous for hollow bodies of synthetic material, as the content of the hollow bodies oxidizes due to oxygen diffusion and may be changed in an undesirable manner. This applies for solids and liquids which are stored in bottles or other containers, as well as for flowing liquids contained in a closed loop or circuit.

Of particular importance among the plastics articles with circulating liquids are floor heating systems with heating pipes of synthetic material by which heated water is conducted in a circuit. In such system, the plastic pipe or tubing is laid onto the surface of a particular room and cast in using concrete, cement or the like. The oxygen diffusion of such pipes is sufficient to cause severe corrosion of the metal parts of the system, e.g., the boiler and pump.

It can be assumed that the amount of oxygen diffusing through a synthetic pipe system of a house with about 500 meter of the plastic piping causes a metal erosion of about 300 g iron yearly, whereby about 400 g rust sludge are formed. As this is a considerable problem, various trails have been made to lessen the oxygen diffusion through plastic articles, in particular plastic pipes for floor heatings. A good hindering of oxygen diffusion is provided by completely casing the plastic pipe by a metal, e.g., an aluminum foil. Unfortunately, the practical use of a thin metal coating over the plastic pipe creates considerable installation problems and high costs. It has been proposed to coat the plastic pipe by pulling a thin sleeve of a relatively oxygen impermeable plastic over the tubing. Due to the vulnerability of this thin sleeve, it is often covered by a protective plastic layer. The plastic pipe lies relatively loose within the two coverings which requires a protection against shifting in the axial direction. This is accomplished by welding the sleeve, at regular distances, to the pipe. Unfortunately, air becomes trapped between the pipe and oxygen impermeable barrier. This trapped oxygen can still diffuse through the pipe into the heating medium. In addition, the airpockets which become trapped during the pouring of the floor impede the heat transfer of the heating medium to the floor which results in a substantial start-up retardation of the floor heating. Moreover, notwithstanding the protective covering, the loose layer of the covering can easily become stuck to extending parts and points and torn by freeing attempts or continued movement.

It has also been suggested to provide the plastic pipes with a coating of an oxygen barrier by sealing the plastic pipe in an at least a three-layer, normally a five-layer, synthetic laminate film whereby the laminate comprises a barrier layer for oxygen, an adhesive agent and a sealable layer. Materials suggested for the barrier layer include polyvinyl alcohol, vinyl alcohol-ethyene copolymers or polyacrylonitrile. Unfortunately, this sealing also involves high costs. Furthermore, the sealing seam is a weak point in the piping system. In addition, since the ends of the pipes are uncoated, they provide a point of weakness. Specifically, if the pipes are in contact with water, damage to the water soluble barrier layers and the protective layer is experienced.

A suggestion concerns a coated plastic pipe for a floor heating. The coating should be oxygen diffusion retarding and flexible. There is, however, no coating material among those which have been stated which shows these effects sufficiently.

It is, therefore, the object of the invention to provide a coating composition by which coatings on plastics articles are obtained which hinder oxygen diffusion and have the necessary properties of flexibility for the use of the coated plastics articles.

According to the invention, this object is solved by a coating composition comprising a vinylidene chloride copolymer and a polyurethane whereby this composition is characterized in that it comprises 75 to 95 weight percent of a thermoplastic vinylidene chloride copolymer and 25 to 5 weight percent of a thermoplastic polyester urethane on a basis of a polyester polyol of an aliphatic diol and an aliphatic dicarboxylic acid or of an aliphatic lactone or a mixture of both and an aromatic diisocyanate, whereby the percentages refer to the total weight of the copolymer and polyester urethane.

This coating composition can be used as such whereby it is applied from the melt onto the substrate. It can, however, also be present in the form of a solution, for instance in tetrahydrofuran or tetrahydrofuran/toluene 70:30 parts by weight. Such solutions may comprise up to 23 weight percent of the polymer mixture. Furthermore, the coating composition can comprise usual additives like stabilizers and lubricants.

Advantageously, the coating composition according to the invention comprises 80 to 92, preferably from 85 to 92, more preferably from 88 to 91 weight percent of the vinylidene chloride copolymer and 20 to 8, preferably from 15 to 8, more preferably 12 to 9 weight percent of the polyester urethane.

The thermoplastic vinylidene chloride copolymer present in the coating composition according to the invention comprises as polymerized comonomer radically polymerizable, ethylenically unsaturated monomers which preferably facilitate the thermoplastic working of the copolymer and influence the crystallization as little as possible. Such comonomers include vinyl chloride, acrylonitrile, methyl acrylate, methyl methacrylate, esters of the acrylic or methacrylic acid with higher alcohols, vinyl acetate, butadiene, isoprene or chlorobutadiene along with such usual modifiers as polybutadiene, polyisoprene and polychlorobutadiene.

The preferred comonomers and their cocentration are dependent on various factors including the effect of the comonomer on the barrier properties, the workability and stiffness of the vinylidene chloride polymer. In general, to maintain the desired barrier properties, the copolymer will be derived from at least 70, more preferably 75, weight percent, based on the total polymer weight, of the vinylidene chloride. Preferred comonomers are vinyl chloride and methyl acrylate. Most preferably, the copolymer comprises 72 to 91 weight percent of polymerized vinylidene chloride and 28 to 9 weight percent of polymerized vinyl chloride or 85 to 98 weight pecent polymerized vinylidene chloride and 15 to 2 weight percent polymerized methyl acrylate. Beside copolymers prepared from two monomeric components, vinylidene chloride copolymers useful herein can be prepared from vinylidene chloride and two or more comonomers.

The thermoplastic polyester polyurethanes according to the invention derive from a polyesterdiol and a diisocyanate. The polyesterdiol is a condensation product of a saturated aliphatic diol, preferably an alcohol containing two primary hydroxyl groups and a saturated aliphatic dicarboxylic acid. Preferably the diol contains from 2 to 10, more preferbly from 3 to 6 carbon atoms in the molecule. The dicarboxylic acid preferably contains from 4 to 10, more preferably 6 to 9 carbon atoms in the molecule. The most preferred diols are 1,4-butanediol and 1,6-hexanediol and the most preferred dicarboxylic acid is adipic acid.

Also preferred as polyester diols are the condensation products of a saturated aliphatic lactones, in particular caprolactone.

Diisocyanates useful in the preparation of the polyester urethanes include the aromatic diisocyanates such as phenylene diisocyanate, the various isomeric toluylene diisocyanates, 1,5-naphthylene diisocyanate and methylenediphenyl-4,4-diisocyanate. The most preferred diisocyanate is methylenediphenyl4,4-diisocyanate.

Advantageously, the thermoplastic polyurethanes have melt index according to the ASTM D 1238/78 of 8 to 15 g/min at 200° C. Their Shore A hardness is preferably 80 to 90.

The blending of the vinylidene chloride copolymer and the polyester urethane can be performed in a simple manner and by usual mixing means.

The application of the layer preventing oxygen diffusion is carried out preferably from a melt of the vinylidene chloride copolymer and the polyester urethane. For coating synthetic pipes, including polyolefin pipes and similar synthetic bodies known coating means are suitable, e.g., an extruder with a cross head ring die. In general, the temperatures during the extrusion coating are 140° to 170°˙C. The optimum extrusion conditions can be found out by simple tests.

In general, the thickness of the layer of the coating composition according to the invention should be 20 to 300, preferably 80 to 200 $\mu$m, in order to obtain a sufficient impermeability against oxygen diffusion. Synthetic pipes for floor heatings known for this purpose can be coated with composition of the invention by means of an extruder with a cross head ring die. In said process, the inner side of the ring jet prepares a tube of the melt to coat the previously prepared pipe. The liquid melt is pressed out of the ring jet at a pressure such as from 8 to 11 bars and due to its natural tendency to shrink will attach somewhat prestressed to the pipe a few millimeters after the jet. Alternatively, the material coming out of the extruder is directed directly onto the pipe, whereby the thickness of the covering is then established by a calibration jacket of the already covered tubing. The coated pipe can also be prepared in one working step by means of co-extrusion. An excellent adhesion of the coating to the pipe is obtained in this manner.

The pipes may for instance consist of polyolefins, e.g., propylene-ethylene-copolymers, polybutene, crosslinked medium density low pressure polyethylene or ethylene-octene copolymers.

To prevent blocking and mechanical damage of the coated pipes, it is advantageous to cover the barrier layer with a protective layer. For this purpose flexible thermoplastic polymers used for the pipes are suitable with a copolymer of ethylene and a higher $\alpha$-olefin, commoly referred to as linear low density polyethylene, in particular ethylene-octene-1. The protective layer is applied preferably with a second extruder with a cross head ring die after the application of the barrier layer. Floor heating pipes which have been coated in that way, have an excellent resistance to oxygen diffusion and further do not involve installation difficulties due to their flexibility. Further foils prepared from the composition of the invention in the known manner, can be added to the seamless coating to provide a jacketing of synethetic articles and subsequent sealing of the oxygen diffusion barrier articles.

Another coating method particularly useful for articles having a complicated shape, e.g., bottles or canister is wetting articles of an oxyge-permeable polymer with a solution of the coating composition and drying the coating obtained. The articles to be coated can be dipped into the solution forming the oxygen barrier or they can be sprayed with said solution. This provides also a good oxygen impermeability of the coated articles.

In the following Examples, the invention will be explained further. All statements on amounts and percentages are weight statements, insofar as nothing else is stated.

EXAMPLE 1

A pipe useful for a floor heating with a total diameter of 20 mm and a wall thickness of 2 mm consisting of an ethylene-octene copolymer crosslinked by electron rays having a melting index of 1 and a density of 0.930 was coated in an extruder with a ring die with a seamless coating of a mixture of 90 percent of a thermoplastic copolymer consisting of 80 part vinylidene chloride and 20 parts vinyl chloride and 10 percent of a linear thermoplastic polyester-urethane. The polyester urethane was the reaction product of a polyesterdiol of 1,4-butanediol and adipic acid with methylenediphenyl-4,4-diisocyanate.

During extrusion, the temperature profile was 140° to 170° C. Depending on the drawing off speed of the coated pipe coating thicknesses of 50 to 300 $\mu$m have been obtained.

The oxygen permeability of the pipe has been considerably diminished by the coating. The following comparison of a pipe with a layer thickness of 125 $\mu$m with an uncoated pipe reveals the following values:

Coated pipe $0.00158$ cm$^3$O$_2$/m pipe/24 h/atm

Uncoated pipe $0.431$ cm$^3$O$_2$/m pipe/24 h/atm

Therefore, the oxygen permeability, which causes the corrosion, of the coated pipe is only 0.37 volume percent of that of an uncoated pipe.

The measuring of the oxygen diffusion was performed according to ASTM 1434 (isotactic measuring principle).

The coated pipe is flexible and can be easily installed in floor heatings.

EXAMPLE 2

A 20×2 mm pipe of a propylene copolymer has been coated according to Example 1 using an extruder with a ring die with the coating composition of the invention. The coating composition comprises 90 percent of a thermoplastic copolymer of 80 parts vinylidene chloride and 20 parts vinyl chloride and 10 percent of a polyester urethane on the basis of polycaprolactonediol and methylenediphenyl-4,4-diisocyante. The temperature profile during extrusion was 140° to 160° C.

Depending on the drawing off speed, a coating thickness of the pipe of 50 to 300 μm has been obtained.

The coated pipes had an excellent oxygen impermeability which was not influenced by the installation for floor heatings.

EXAMPLE 3

A synthetic pipe as in Example 1 has been extrusion coated with the therein stated mixture of a thermoplastic copolymer of vinylidene chloride and vinyl chloride and the therein stated polyester urethane. The coated pipe was subsequently coated in a second extruder with a ring die with a seamless protective layer of an ethylene-octene copolymer. The outer layer protects the oxygen barrier layer against mechanical damages during installation; furthermore it prevents blocking of the pipes coated with the coating composition of the invention.

I claim:

1. A method for reducing the oxygen permeability of a plastic pipe by coating the plastic pipe with a coating composition comprising from 75 to 95 weight percent of a thermoplastic vinylidene chloride copolymer and 25 to 5 weight percent of a thermoplastic polyester urethane having a Shore A hardness of 80 to 90 derived from (1) a polyester polyol which comprises (a) a condensation product of a saturated aliphatic diol and a saturated aliphatic dicarboxylic acid, (b) a condensation product of a saturated aliphatic lactone, or (c) mixtures of (a) and (b); and (2) an aromatic diisocyanate, whereby the percentages refer to the total weight of the copolymer and the polyester urethane.

2. The method of claim 1 wherein the pipe is a polyethylene or polypropylene pipe.

3. A plastic pipe coated with a barrier layer of the coating composition comprising from 75 to 95 weight percent of a thermoplastic vinylidene chloride copolymer and 25 to 5 weight percent of a thermoplastic polyester urethane having a Shore A hardness of 80 to 90 derived from (1) a polyester polyol which comprises (a) a condensation product of a saturated aliphatic diol and a saturated aliphatic dicarboxylic acid, (b) a condensation product of a saturated aliphatic lactone, or (c) mixtures of (a) and (b); and (2) an aromatic diisocyanate, whereby the percentages refer to the total weight of the copolymer and the polyester urethane.

4. The coated plastic pipe of claim 3 wherein the coating composition comprises from 80 to 92 weight percent of the thermoplastic vinylidene chloride copolymer and from 20 to 8 weight percent of the thermoplastic polyester urethane.

5. The coated plastic pipe of claim 3 wherein said pipe comprises polyethylene or polypropylene.

6. The coated plastic pipe of claim 5 wherein the coating has a thickness from 20 to 300 microns.

7. The coated plastic pipe of claim 5 wherein the coating comprises from 88 to 91 weight percent of the vinylidene chloride copolymer and from 12 to 9 weight percent of the polyester urethane.

8. The coated plastic pipe of claim 5 wherein the barrier layer is coated with a protective layer.

9. The coated plastic pipe of claim 8 wherein the protective layer is a linear low density polyethylene.

* * * * *

UNITED STATES PATENT AND TRADEMARK OFFICE
CERTIFICATE OF CORRECTION

PATENT NO. : 4,710,413
DATED : December 1, 1987
INVENTOR(S) : Wolfgang Quack

It is certified that error appears in the above-identified patent and that said Letters Patent is hereby corrected as shown below:

On the title page, assignee should read -- Dow Chemical Handels- Und Vertriebsgesellschaft MBH --.

Col. 1, line 31, "trails" should read -- trials --.

Col. 1, line 63, "ethyene" should read -- ethylene --.

Col. 2, line 51, "cocentration" should read -- concentration --.

Col. 2, line 63, "pecent" should read -- percent --.

Col. 3, line 7, "preferbly" should read -- preferably --.

Col. 3, line 14, "lactones" should read -- lactone --.

Col. 3, line 21, "methylenediphenyl4,4-diisocyanate" should read -- methylenediphenyl-4,4-diisocyanate --.

Col. 3, line 67, "commoly" should read -- commonly --.

UNITED STATES PATENT AND TRADEMARK OFFICE
CERTIFICATE OF CORRECTION

PATENT NO. : 4,710,413

DATED : December 1, 1987

INVENTOR(S) : Wolfgang Quack

It is certified that error appears in the above-identified patent and that said Letters Patent is hereby corrected as shown below:

Col. 4, line 9, "synethetic" should read -- synthetic --.

Col. 4, line 13, "oxyge-" should read -- oxygen --.

Col. 5, line 3, "diisocyante" should read -- diisocyanate --.

Col. 6, line 23, "polypropylene" should read -- polypropylene pipe --.

Signed and Sealed this

Eleventh Day of April, 1989

Attest:

DONALD J. QUIGG

Attesting Officer

Commissioner of Patents and Trademarks